Sept. 23, 1947.    L. W. LESSLER    2,427,795
DETACHABLE DENSITOMETER ARM COMPRISING
COMBINED HINGING AND BIASING MEANS
Filed June 7, 1944    2 Sheets-Sheet 1

INVENTOR.
LEW W. LESSLER.
BY
ATTORNEYS

Sept. 23, 1947.                L. W. LESSLER                 2,427,795
             DETACHABLE DENSITOMETER ARM COMPRISING
               COMBINED HINGING AND BIASING MEANS
                     Filed June 7, 1944            2 Sheets-Sheet 2
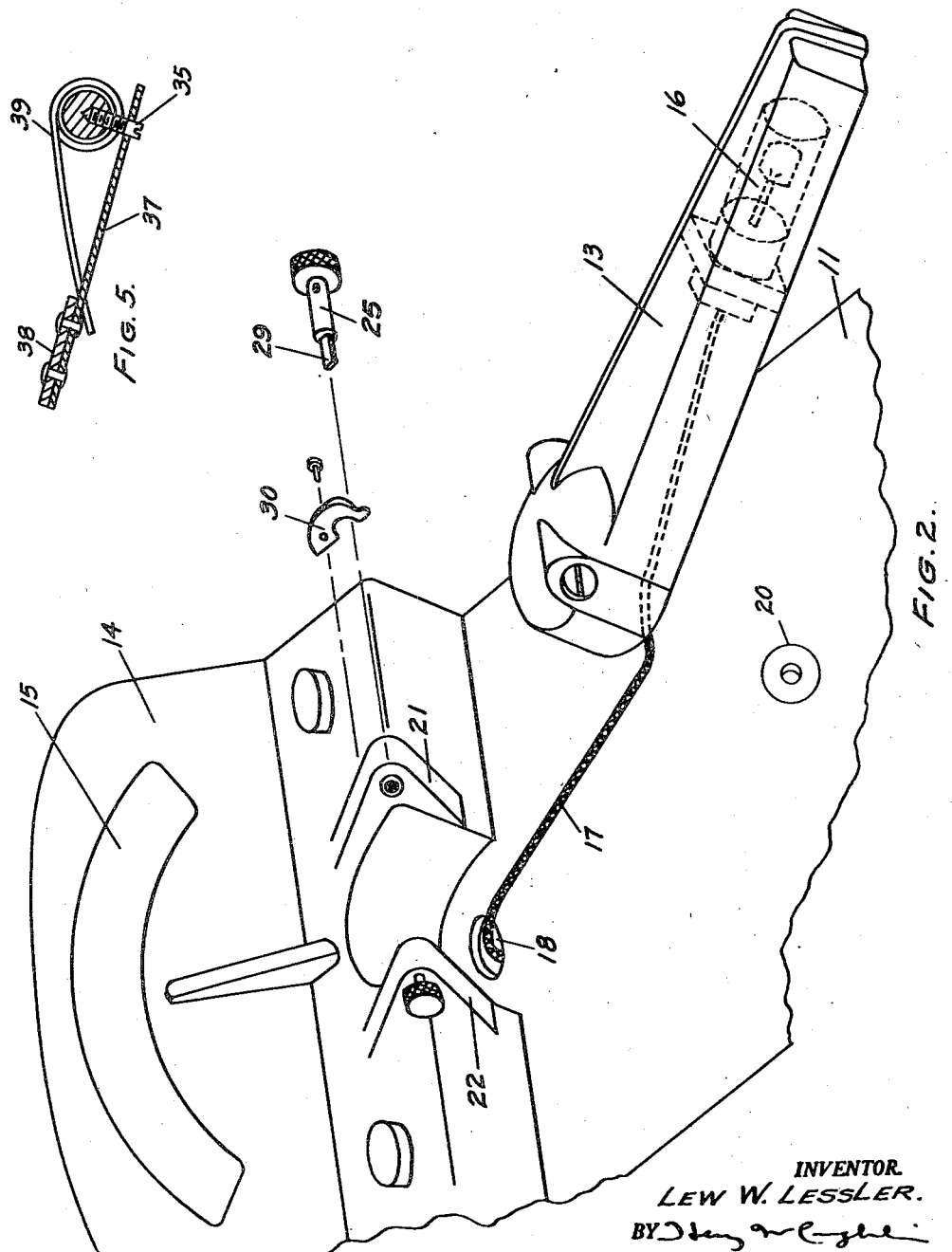
INVENTOR.
LEW W. LESSLER.
BY
ATTORNEYS.

Patented Sept. 23, 1947

2,427,795

UNITED STATES PATENT OFFICE 2,427,795

DETACHABLE DENSITOMETER ARM COMPRISING COMBINED HINGING AND BIASING MEANS

Lew W. Lessler, Binghamton, N. Y., assignor to General Aniline & Film Corporation, New York, N. Y., a corporation of Delaware Application June 7, 1944, Serial No. 539,086

5 Claims. (Cl. 88—14)

1

This invention pertains to densitometers, and is more specifically concerned with hinged arms or members normally operated as a connected part of the instrument, but adapted to be quickly detached and extended for use in a position removed from a casing or other parts of the instrument. The invention includes a self-contained removable arm, in which is permanently carried a hinge and tension and stop means by which the arm is returned to an inactive position and maintained in that position until it is again to be used.

While the invention applies to all similar instruments known and used in the photographic art, for convenience it is herein described by particular reference to a densitometer commercially available at this time.

The general construction of densitometers of this type includes a frame or casing within which are a source of light and an electrical circuit connected to a meter for indicating the density of various translucent materials. A photo-responsive device of any of the types commonly employed is carried by a swinging, removable arm pivoted on the casing and is adapted to be brought into alignment or registry with an opening in the casing lighted by rays from the enclosed light source. Material, the density of which is to be measured, is placed over the lighted opening or window in the casing and in normal practice the arm is moved downwardly or in an appropriate direction, until the photo-responsive device is centrally positioned with respect to the lighted window and in contact with the material, the density of which is to be ascertained. Density may then be indicated at the scale of the instrument.

At times it is desirable to apply the photo-responsive device to material at a point removed from the lighted window, that is, to some material remote from the instrument and lighted by some other source of illumination than that provided within the instrument itself. According to the invention, improvements are made in the mechanism by which the cell carrying arm is hingedly attached to the casing so that it may be more easily and more quickly detached from or returned to operative relationship with the casing and parts included therewith. The cord connecting the light-sensitive cell to the internal electrical elements of the instrument extends within the arm and normally passes through an opening beneath the connecting hinge to be wound upon a reel or drum within the casing. That reel or drum automatically takes up any

2 slack in the cord, but allows unwinding thereof so that the same may be extended and drawn out through the above-mentioned opening whenever the arm and cell are disconnected and employed at a distance from the instrument itself.

It is an object of the invention to provide a hinge, part of which will be carried within the arm and which will be maintained in an appropriate position to be properly engaged by the associated hinge members carried by the casing. It is a further object of the invention to maintain the arm and its hinge in a pre-determined position and to maintain the hinge biased or tensioned in a direction to keep the arm in its inactive position, the construction being such that connecting and disconnecting the arm does not interfere with this tensioning means. Other objects will be apparent as the disclosure progresses. The invention will be described by reference to a specific embodiment of the same as exemplified in the accompanying figures of drawing in which:

Fig. 2 is an exploded view of part of the densitometer casing, the arm and hinge members, the arm being disconnected and removed a few inches from its normal position.

Fig. 5 is a sectional view in which details of the stop means for the arm and the tensioning spring are shown.

Figure 1:
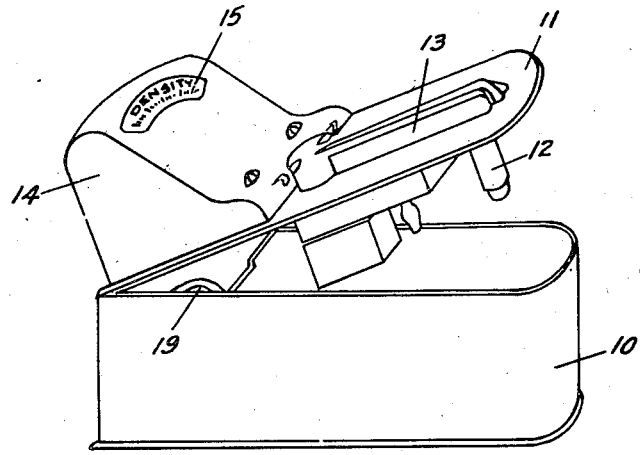
Fig. 1 is a perspective view showing the general characteristics of a densitometer of this type.

Now referring to Figs. 1 and 2, the densitometer includes a two part casing made up from a box 10 and a cover 11 which is hinged and, as shown, capable of being raised to expose the enclosed parts of the instrument. The instrument includes various electrical circuits, a description of which is not essential here, a light source 12, a light-sensitive cell carrying arm 13, and a meter enclosed within an upper casing member 14, the graduated scale of which is visible through a window 15 within which is a pointer or needle for indicating on the scale the density of material being measured. The arm generally indicated at 13 and having enclosed within its outer end a light cell 16, is hinged to the upper casing member 14 by a novel hinge construction hereinafter to be described in more detail. The cell 16 connects to the meter by an electrical cord or cable 17 extending downwardly through an opening 18, and passing about a reel 19 within the box portion 10 of the instrument. That reel is spring actuated in such a manner as to take up any slack in the cord and maintain it within the casing except as it is drawn out for the purpose of employing the light cell at a position removed from the instrument itself. Rays from a light source 12, especially designed for the purpose, pass upwardly through a small window 20 in the top of the cover 11. When the arm 13 is hinged to the casing, cell 16 will be centrally disposed with respect to the window as the arm is lowered to the position shown in Fig. 1.

Figures 3, 4:
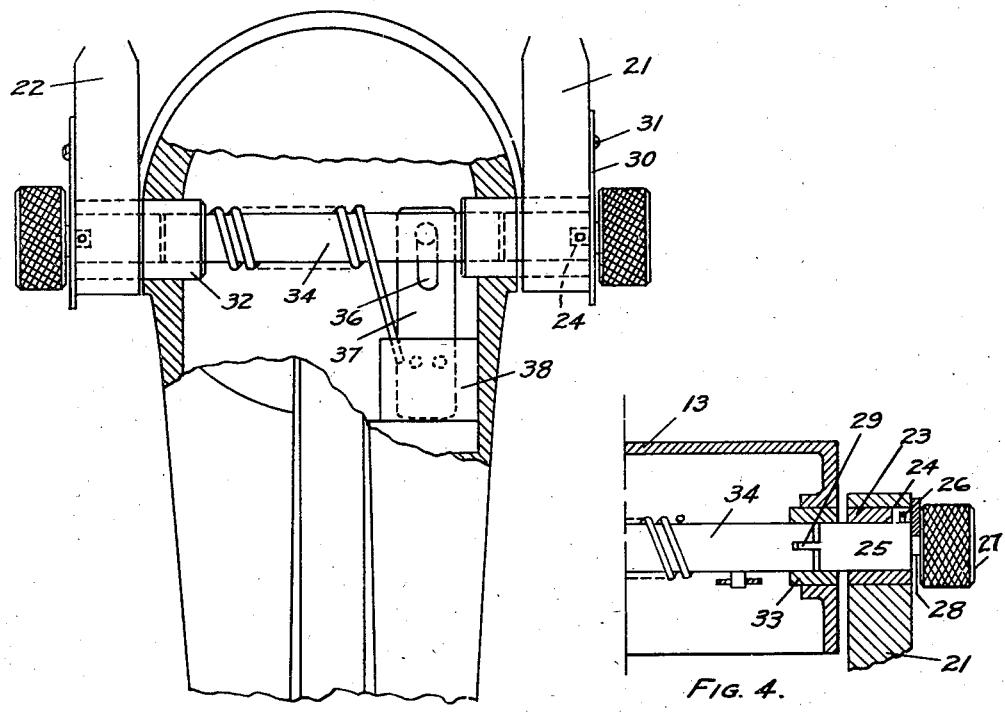
Fig. 3 is a partial section showing details of the hinge, spring tensioning and stop means.
Fig. 4 is a section taken vertically through one part of the hinge and showing further details thereof.

Now referring to Fig. 2, the upper casing 14 which is preferably cast from some light metal such as aluminum, is provided with projecting lugs 21 and 22 between which is a recess for receiving the hinged end of the arm. As further shown in Figs. 3 and 4, each lug has a bushing 23 which is retained by a tight press fit, or by any other appropriate means. The bushings are notched at their outer ends as shown at 24. Within each of the bushings 23, a trunnion 25 is freely slideable, but is prevented from rotating by engagement of a projecting pin 26 fitting into notch 24. Each of the trunnions 25 has a knurled head 27, a groove 28, and a projecting, flattened extension or tongue 29. A latch 30 engages within groove 28 as shown in Fig. 4, and by means of these latches, the trunnions are retained in position, or alternatively may be released for withdrawal when the arm 13 is to be removed. Each of the latches 30 is pivoted at 31, and may easily be swung upwardly to disengage the trunnion when desired.

The arm casting is drilled for the reception of bushings 32 and 33 of a diameter for receiving the extending ends of the trunnions and also for rotatably retaining the central part 34 of the hinge. These bushings are also a press fit in the arm casting, and it is to be understood that while bushings are employed both in the lugs and in the arm, the trunnions and hinge may be retained in bearings formed within the casing and arm casting themselves.

The hinge part 34 is slotted at each end to receive the projections 29 whereby that central part of the hinge is retained against rotation when the entire unit has been assembled. The arm may be swung about the trunnions 25 and the hinge part 34 since the bushings 32 and 33 are free to rotate thereon. Movement of the arm in a direction upwardly or away from the cover 11 is limited by a projecting stud 35 threaded into the hinge part 34 and engageable in a slot 36 in strip 37 attached to a small bracket 38 fixed within the arm 13. A coiled spring 39 is fixed at one end to the hinge part 34 and projects away from the hinge at its opposite end to engage beneath bracket 38 and thereby, through its tension, always tends to rotate the arm about the hinge so as to raise it from the cover or to its inactive position. The tension in spring 39 is not excessive, and when density of material is to be measured, the arm is easily pressed downwardly into contact with that material and will return to elevated position upon release.

When it is desired to remove the arm and apply the cell to material, the density of which is more appropriately measured without placing it over the lighted window 20, the latches 30 are raised whereupon trunnions 25 may easily be drawn outwardly until they entirely disengage the bushings 32 and 33. Then the arm which serves as a handle or guide for applying the cell 16 to the material to be measured is removable as a unit and may be extended up to a limit determinable by the length of the cord 17. The hinge part 34 remains with the arm casting, and spring 39 holds that hinge member in its extreme position as determined by the stop stud 35 and slot 36.

The arm and cell may be returned to position by aligning the center of the bushings 32 and 33 with the trunnions and then pushing inwardly until each trunnion has engaged its projection 29 within the cooperating slot and until pins 26 have entered the notches 24. The latches 30 are then moved to position for locking the assembly in place after which it may be used to take readings of densities of material superimposed over the lighted window 20.

The invention has been described by reference to a specific embodiment of the same. It is to be understood that modifications are contemplated and that the invention may be applied to other than the particular type of densitometer herein shown and described.

The trunnions 25 are herein shown and described as being identical. In certain instances it is sufficient for one trunnion to have the extension or tongue 29, and, accordingly, the part of the hinge carried by the arm need be slotted at that end only. The other trunnion would, in that case, act only as a bearing or pivot. Other types of spring may be employed, and the stop stud 35 may contact some other type of element fixed to the arm. In fact, the spring may be differently constructed so as to act in raising the arm to elevated position and then may constitute a stop member or, at least, will resiliently retain the arm in that relative position thereby making it unnecessary to provide a separate stop.

The interconnection between the trunnions and the central portion of the hinge is herein shown as a screw driver-type joint. The projection 29 may be reversed so that the trunnion is slotted and the projection a part of the hinge 34. Any other suitable rotation preventing joint or connection may be employed at that point.

While one embodiment of the invention has been disclosed, it is to be understood that the inventive concept may be carried out in a number of ways. This invention is, therefore, not to be limited to the precise details described but is intended to cover all variations and modifications thereof falling within the spirit of the invention and the scope of the claims.

I claim:

1. In a densitometer, the combination of a casing, a light source within the casing and an opening in said casing through which light from said source is directed, an arm hinged to said casing carrying a light-responsive cell and movable to bring said cell into alignment with said opening, the hinge for said arm including a hinge part contained within the arm and upon which the arm is rotatably mounted, and pivot means for the arm carried by the casing, said hinge further including stop means for preventing angular movement between the arm and hinge part contained therein beyond a predetermined extent, and spring means attached to the said hinge part and to the arm for resiliently tending to rotate the arm about said hinge part in a direction to retain the arm in an extreme position as determined by the said stop means, said pivot means comprising lugs extending from the casing, a removable trunnion in each lug extending into and rotatably supporting the arm, means to prevent rotation of the trunnions in their lugs, means to lock said trunnions against unintended removal, each said trunnion having a tongue for engaging within a cooperating slotted end of the hinge part, and means slideably supporting said trunnions in said lugs for withdrawal from the arm to release the tongues from the cooperating slotted ends of the hinge part and to permit removal of the arm from the casing.

2. In a densitometer, the combination of a casing, a light source within the casing and an opening in said casing through which light from said source is directed, an arm hinged to said casing, said arm carrying a light-responsive cell and being movable about its hinge for bringing the light-responsive cell into operative alignment with said opening, the hinge for said arm including a hinge part upon which the arm is rotatably mounted and spring biasing means attached at one end to the said hinge part and at its other end to the arm and tending to rotate it about said part to a raised position with respect to the casing and lighted opening, and non-rotatable hinge portions carried by the casing and having means extending into and rotatably supporting the arm and releasably interlocked with the hinge part therein for preventing it from rotating, and means supporting said means extending into the arm for withdrawal from the arm to release the interlocking connections and to permit removal of the arm from the casing.

3. In a densitometer, the combination of a casing, an arm hinged to said casing, a light source within the casing and an opening in the casing through which light from said source is directed, a light-sensitive cell carried by said arm and movable therewith to a position in which the cell is operatively aligned with said opening, an indicating meter within the casing and an extensible electrical connection extending from the meter and through the arm to the light-sensitive cell, the hinge for said arm comprising a hinge part within the arm upon which said arm is rotatably mounted, and a non-rotatable part forming an extension from the casing, said non-rotatable hinge part including a plurality of trunnion means pivotally engaging and supporting said arm, and means for interlocking the hinge part carried by the arm with one of the trunnion means for restraining the part in the arm against rotation relatively to the casing, spring means attached at one end to the arm and at the other end to the hinge part carried thereby for biasing the arm in one direction about the hinge part within the arm, and means for releasably locking said trunnion means in position, and means supporting said trunnion means for withdrawal from the arm to release the interlocking connection and to permit removal of the arm from the casing.

4. In a densitometer, the combination of a casing, a light source within the casing and an opening in said casing through which light from said source is directed, an arm hinged to said casing, said arm carrying a light-responsive cell and being movable about its hinge for bringing the light-responsive cell into operative alignment with said opening, the hinge for said arm including a hinge part upon which the arm is rotatably mounted and spring biasing means attached at one end to the hinge part and at its other end to the arm and tending to rotate it in one direction about the hinge part within the arm, and hinge portions carried by the casing and having means extending into and rotatably supporting the arm, means for preventing relative rotation between one of said hinge portions and the casing, said non-rotatable hinge portion having means for releasably interlocking it with the hinge part within the arm for restraining that hinge part from rotation, and means supporting said hinge portions for withdrawal from the arm to release the interlocking connection and to permit removal of the arm from the casing.

5. In a densitometer, the combination of a casing, a light source within said casing and an opening in said casing through which light from said source is directed, an arm hinged to said casing carrying a light sensitive cell and movable to bring said cell to a position in alignment with said opening, current carrying means from said cell passing through a second opening in said casing and connected to electrical elements of the densitometer within the casing, the hinge for said arm including elements carried by and enclosed within the arm and other elements mounted on the casing, those elements of said hinge enclosed within the arm including bushings at either side of the arm, a hinge part upon which said arm and bushings are rotatably mounted, a bracket extending from said arm and having attached thereto stop means for limiting the travel of the arm upwardly away from the casing comprising a member having a slot within which engages a stud projecting from said hinge part, spring biasing means coiled about said hinge part and having a connection thereto at one end and to the bracket at the other end for tending to rotate the arm upwardly about said hinge part, those elements of the hinge mounted on the casing including lugs projecting from the casing, notched bushings fixed in said lugs, trunnions mounted in said bushings and extending into the bushings in the arm, each trunnion having a pin received within the notch of its respective bushing, a latch pivoted to each lug and engaged within a groove adjacent the outer end of the adjacent trunnion, and a screw driver type joint connecting each trunnion with the adjacent end of the hinge part about which the arm rotates, for preventing rotation of that part relatively to the casing, said trunnions being slidably supported in said notched bushings for withdrawal from the arm to release the screw driver type joints and to permit removal of the arm from the casing.

LEW W. LESSLER.

REFERENCES CITED

The following references are of record in the file of this patent:

UNITED STATES PATENTS

| Number | Name | Date |
| --- | --- | --- |
| 2,235,590 | Rockwell | Mar. 18, 1941 |
| 1,301,461 | Ledward | Apr. 22, 1919 |

OTHER REFERENCES

Journal of the Optical Society of America, vol. 32, page 400, published July, 1942.